Mar. 13, 1923.

A. B. ANDREAS.
BOTTLE CAP REMOVER AND SEALER.
FILED MAR. 28, 1921.

1,448,047.

Witnesses:

Inventor
Alex B. Andreas
By Joshua R. H. Potts
His Attorney

Patented Mar. 13, 1923.

1,448,047

UNITED STATES PATENT OFFICE.

ALEX B. ANDREAS, OF CHICAGO, ILLINOIS, ASSIGNOR TO JULIUS G. HOWARD, OF CHICAGO, ILLINOIS.

BOTTLE-CAP REMOVER AND SEALER.

Application filed March 28, 1921. Serial No. 456,280.

*To all whom it may concern:*

Be it known that I, ALEX B. ANDREAS, a citizen of the United States, and a resident of the city of Chicago, county of Cook, and State of Illinois, have invented certain new and useful Improvements in Bottle-Cap Removers and Sealers, of which the following is a specification.

My invention relates to a bottle cap remover and sealer and has for its principal object the provision of an improved construction of this character which will be highly efficient in use.

A further object of my invention is the provision of a cap remover and sealer especially designed for use on a milk bottle which will keep the contents in said milk bottle free from dirt or the like when not in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of a milk bottle showing my improved construction mounted thereon;

Figure 2:
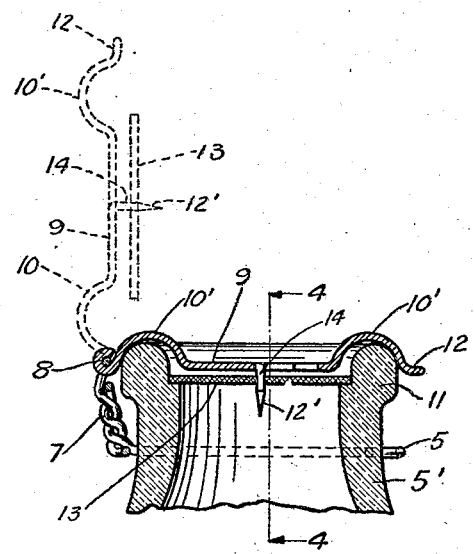
Fig. 2 is a sectional view taken substantially on line 2—2 of Fig. 1.
Figure 1:
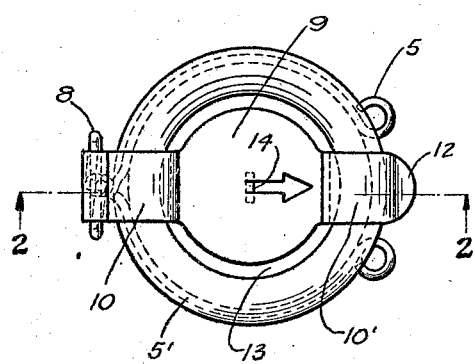
Figure 3:
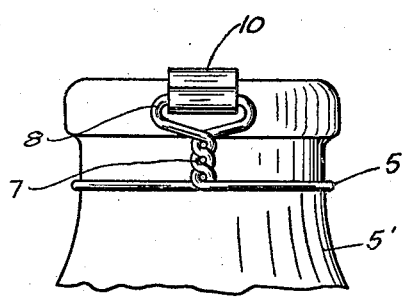
Fig. 3 is a fragmentary elevational view of a milk bottle showing my improved construction mounted thereon.
Figure 4:
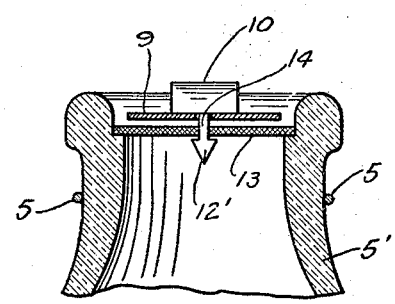
Fig. 4 is a sectional view taken substantially on line 4—4 of Fig. 2.

The preferred form of construction as illustrated in the drawing comprises a supporting member 5 formed from a single piece of resilient material or the like and arranged to be clamped around the neck of a milk bottle 5' or the like just below the rim of the bottle. The central portion 7 of the supporting member 5 is twisted and bent upwardly serving as a hinge 8 for a metallic plate 9 arranged to span the opening of the bottle 5'. The ends 10 and 10' of the metallic plate 9 are curved to correspond with the curvature of the rim 11 of a milk bottle 5'. This arrangement is such that when the plate 9 is in operative position the central depending portion of the plate will be a trifle above the adjacent surface of the cap of the milk bottle. The outer end 10' of the plate 9 is provided with an outwardly turned lip 12 affording a manual lifting means when the cap 13 is raised out of closed position. An arrow shaped member 14 is struck out of the central portion of the plate 9 arranged to penetrate through the cap 13 of the milk bottle 5'.

In operation the supporting member 5 is positioned around the neck of the milk bottle 5' and the plate 9 is pressed downwardly until the prongs 12' penetrate the cap 13 of the milk bottle 5', and the curved ends 10 and 10' engaged with the rim of the said milk bottle. The supporting member 5 is then turned around until the prongs 12' of the arrow shaped member 14 is at right angles with the aperture made by same. This is to prevent the prong 12' from passing through the aperture made by the same when the plate 9 is swung upwardly bringing the cap 13 out of closed position. The device can be used on a milk bottle until the contents contained therein have been exhausted at which time the device is sterilized and ready to be used again.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A device of the character described comprising a spring jaw adapted to be placed on and removed from the neck of a bottle by a movement transversely of the neck, and a member hinged at one end of the jaw in position to permit it to be swung from a position beside the mouth of such bottle to a position in which it lies across said mouth when the jaw is attached to the bottle, said member having an arrowhead projecting from the under side thereof in position to pass approximately vertically through the center of a closing cap for said mouth when said member is pressed down.

2. A device of the character described comprising a spring jaw made of a single piece of wire bent into the form of a C having a post projecting transversely to the plane thereof, said jaw being adapted to be placed on and removed from the neck of a bottle by a movement transversely of the neck of the bottle, and a member hinged at one end to said post in such a manner that it may be swung from a position beside the mouth of a bottle on which the jaw is located to a position in which it extends across said mouth, said member having an arrowhead projecting from the under side thereof in position to pass approximately vertically through the center of a closing cap for said mouth when said member is pressed down.

3. A device of the character described comprising a spring jaw made of a single piece of spring metal bent into the form of a C having a post projecting at right angles to the plane thereof about midway between the ends of the wire, said jaw being adapted to be placed on or taken off the neck of a bottle by a movement transversely of the neck, and an elongated plate hinged at one end to said post, the post being of such a height and the plate being of such a length that the plate may be swung from a position at one side of the mouth of a bottle on which the jaw is located to a position in which it extends entirely across such mouth to permit it to be grasped at the ends in one hand and turned, said plate having an arrowhead projecting at right angles thereto from the center thereof on the under side.

In testimony whereof I have signed my name to this specification in the presence of two subscribing witnesses.

ALEX B. ANDREAS.

Witnesses:
JOSHUA R. H. POTTS,
FREDA C. APPLETON.